Oct. 28, 1969  A. B. LONDON ET AL  3,474,477
METHOD AND APPARATUS FOR MAKING SANDALS AND OTHER OPEN TOP SHOES
Filed Jan. 27, 1967  4 Sheets-Sheet 3

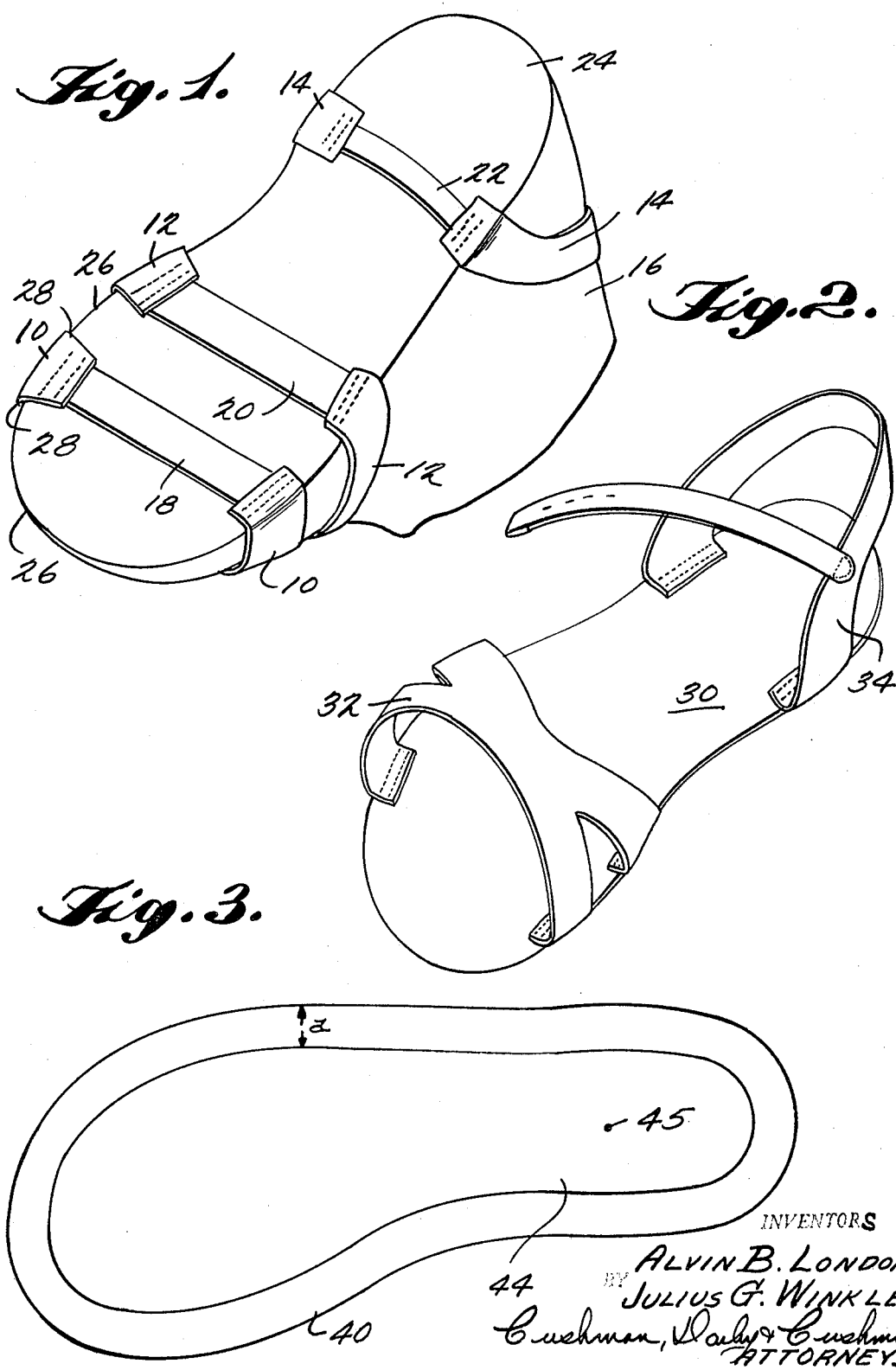

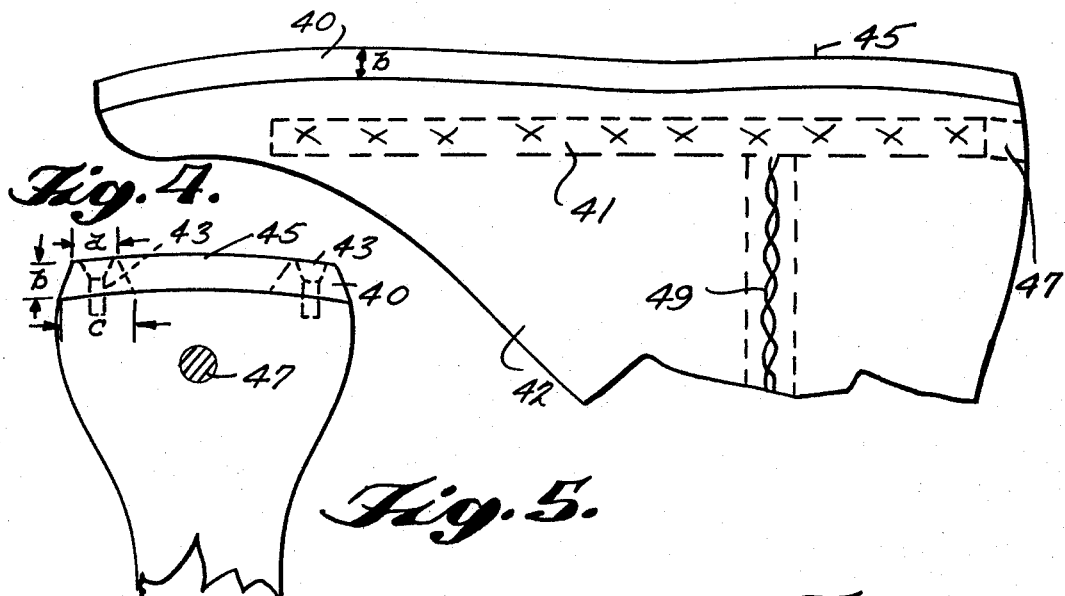
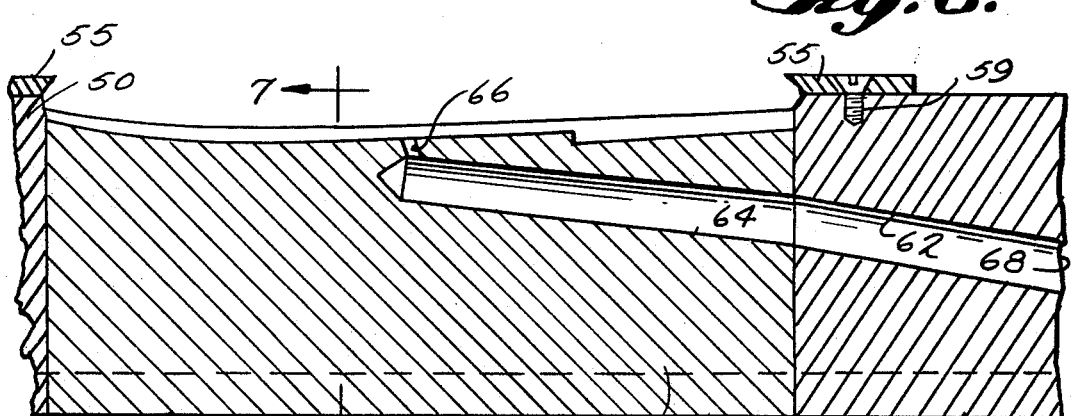
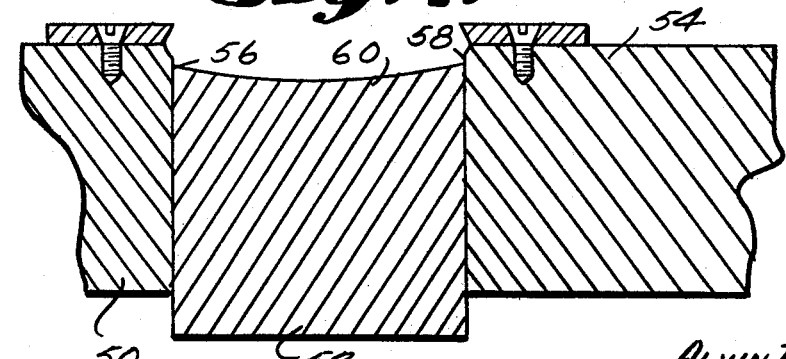

INVENTORS
ALVIN B. LONDON
BY JULIUS G. WINKLER
Cushman, Darby Cushman
ATTORNEYS

Oct. 28, 1969    A. B. LONDON ET AL    3,474,477
METHOD AND APPARATUS FOR MAKING SANDALS AND OTHER OPEN TOP SHOES
Filed Jan. 27, 1967                                    4 Sheets-Sheet 4
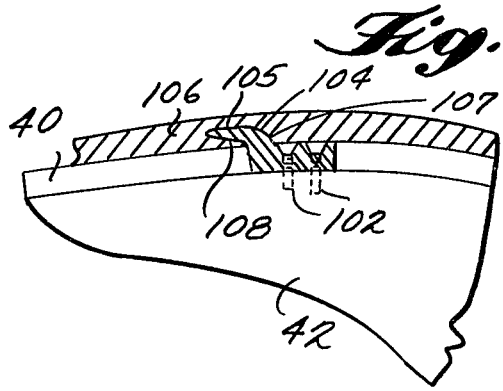
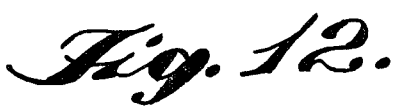
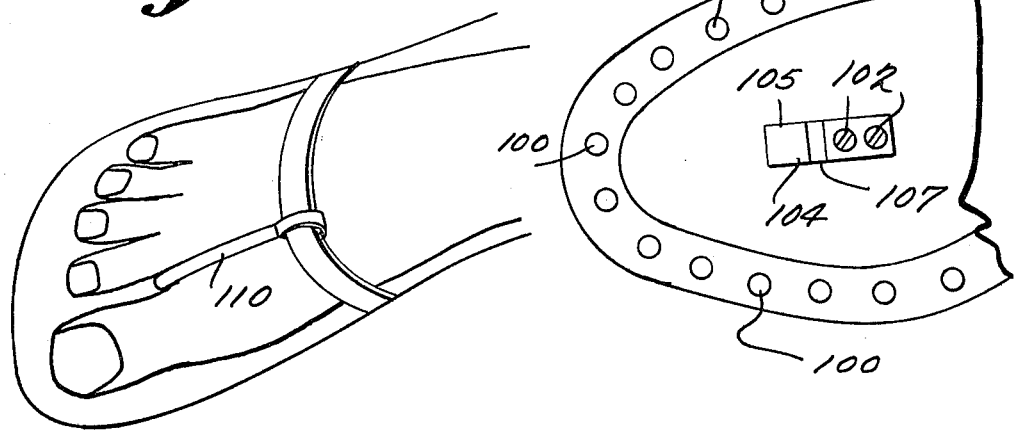
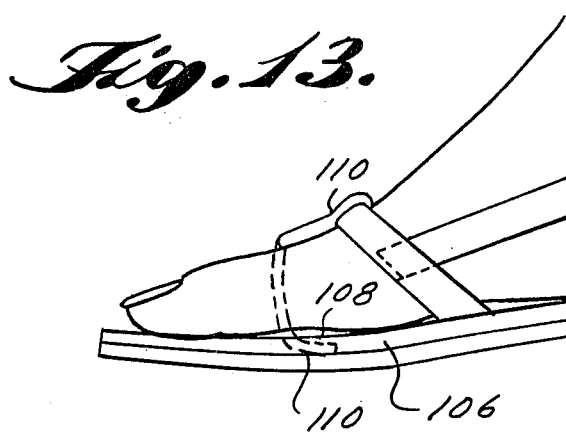
INVENTORS
ALVIN B. LONDON
JULIUS G. WINKLER
BY Cushman, Darby & Cushman
ATTORNEYS

United States Patent Office 3,474,477
Patented Oct. 28, 1969

3,474,477
METHOD AND APPARATUS FOR MAKING
SANDALS AND OTHER OPEN TOP SHOES
Alvin B. London, Baltimore, Md., and Julius G. Winkler,
Lexington, Mass., assignors, by mesne assignments, to
Creative Reserch Corporation, Baltimore, Md., a corporation of Maryland
Filed Jan. 27, 1967, Ser. No. 612,148
Int. Cl. A43d 65/00
U.S. Cl. 12—142           4 Claims

ABSTRACT OF THE DISCLOSURE

This invention relates to apparatus for manufacturing by injection molding shoes being open or partially open where the upper normally meets the soles, such as in sandals. The shoe upper, which would consist of multiple type of straps in the case of a sandal, is attached to a fabric insole or insole of other material suitable for adhering to any type of bottom forming compound by means of stitching, stapling, or heat-sealing. The resulting insole with the attached upper, is mounted onto a metal last having disposed around the periphery thereof a compressible portion made from urethane, silicone rubber or the like. Bottoming material is then injection molded onto the insole to complete the formation of the sole and to form the heel of the shoe. The procedure for forming the mold cavity is as follows: a sole plate is surrounded by rings to form the bottom and sides of the mold cavity. The last is then inserted into the rings, thereby compressing the straps between the rings and the peripheral urethane portion of the last. Thus, an air-tight cavity is formed for molding the bottoming material into the desired shape. Further, this invention includes an adapter which may be attached to a last so that a lip or hook is formed in the bottom of the molded sole thereby facilitating the attachment of a toe-tongue to the sole of a sandal.

---

This invention relates to an improved method and apparatus for forming or manufacturing injection molded shoes being open or partially open where the upper meets the sole such as in sandals; and, in particular, this invention related to an improved method and apparatus for forming an air-tight cavity in an injection molding apparatus for attaching bottoming material to the above-described shoes. This invention is not limited to sandals but involves all styles and types, male and female where the shoes are open or partially open where the upper normally meets the sole.

Heretofore, attempts have been made to injection mold a sole and heel onto above-described shoes. However, these attempts have met with failure because of the difficulty of forming an air-tight cavity into which the bottoming material may be injected. That is, assuming that a sole and heel are to be injection molded onto above-mentioned shoes, the presence of the upper of the shoe prevented the formation of an air-tight molding cavity, since very small air spaces tend to form adjacent the upper, thereby providing a passageway through which the molded material can squirt and thus render the injection molding process impossible.

Thus, it is a primary purpose of this invention to provide improved method and apparatus for forming an air-tight cavity in connection with the injection molding of bottoming material onto shoes that are open or partially open where the upper normally meets the sole.

To date, the manufacture of reasonably priced injection molded shoes with open shank, toe, or heel portions, such as sandals, has generally taken place in those areas of the world where manufacturing costs are quite low. The reason for this is that heretofore the number of steps for producing this type shoe has been quite numerous and thus in order to keep the price of the resultant product down, it has been necessary to employ relatively low priced labor.

Thus, it is a further object of this invention to provide an improved method and apparatus for manufacturing shoes with open shank, toe, or heel portions, such as sandals, by an injection molding process and thereby reducing the number of steps required to manufacture such shoes and, accordingly, reduce the cost of manufacture of such shoes.

Other objects and advantages of this invention will become apparent upon reading the appended claims in conjunction with the following detailed description and the attached drawings, in which:

FIGURE 1 is a pictorial drawing illustrating the problems which arise when attempting injection molding of the shoes and heels onto open top shoes such as sandals;

FIGURE 2 illustrates one embodiment of an upper portion of a sandal preparatory to the formation thereon of a sole and heel by an injection molding process;

Figure 8:
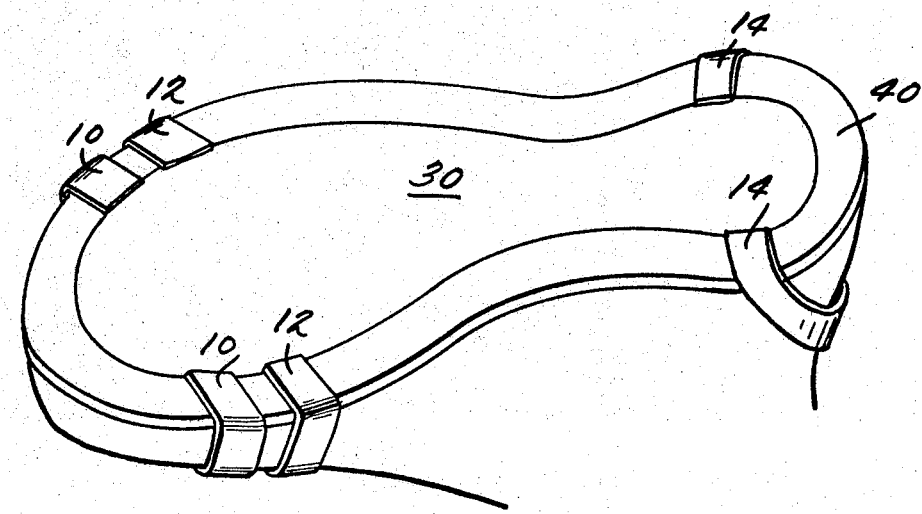
Figure 9:
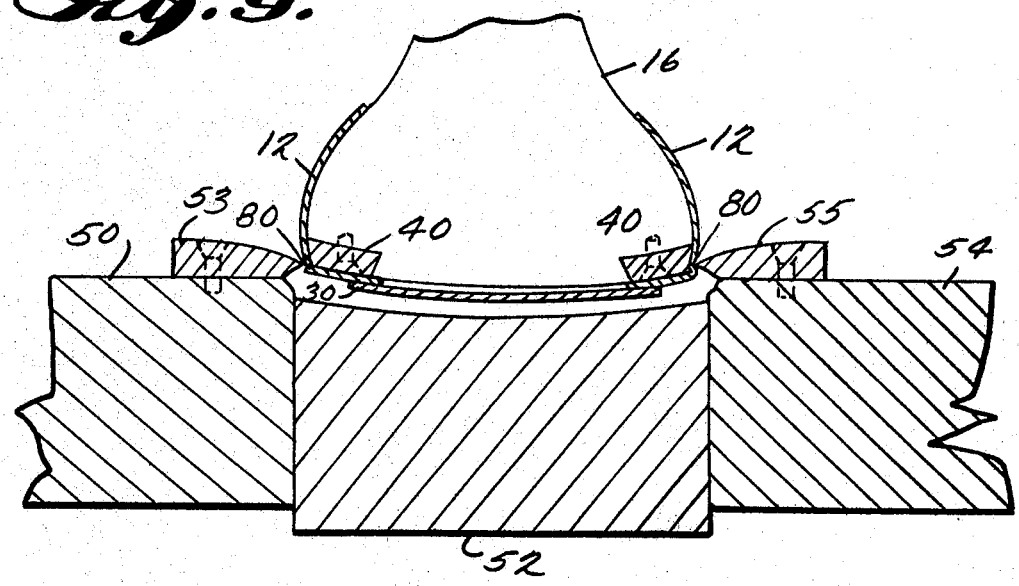

FIGURES 3, 4, and 5, respectively, show illustrative embodiments of top, side and end views of an illustrative embodiment of a last in accordance with the invention;

FIGURE 6 is partial cross-sectional view showing ring and sole plate in juxtaposition to one another;

FIGURE 7 is a cross-section taken along line 7—7 of FIGURE 6;

FIGURE 8 is a pictorial representation of the upper portion of a sandal, as shown in FIGURE 2, mounted onto the last of FIGURE 4;

FIGURE 9 is a cross-sectional view of the last of FIGURE 8 in engagement with the mold ring and sole plate of FIGURE 6, illustrating how the improved last of the invention prevents leakage of bottoming material during the molding operation;

FIGURES 10 and 11, respectively, show side and top views of a preferred embodiment of an adapter mounted to a partially illustrated metal last to produce toe-tongue sandals; and FIGURES 12 and 13 are top and side views of a toe-tongue sandal produced with the adapter illustrated in FIGURES 10 and 11.

Reference should now be made to FIGURE 1 which illustrates the problems which must be overcome in forming the sole and heel by injection molding techniques, on an open type shoe. In FIGURE 1, a strap sandal is shown. Throughout the remainder of the specification, the description of the invention will be in terms of the manufacture of strap sandals; however, it is obvious to those having ordinary skill in this art that this invention is not so limited and is applicable to all types of open type shoes, both male and female types where some portion of shank, toe, or heel is open where the sole normally meets the upper. The shoe upper comprising strips 10, 12 and 14 are mounted to metal last 16 by elastic bands 18, 20, and 22.

In order to attach appropriate soles and heels, by the injection molding technique, to straps 10–14, the bottoming material is injected into a mold having the desired shape for the sole and heel, the top of the mold being formed by surface 24 of the last 16. However, when the bottoming material is injected into the mold cavity, it pushes the straps 10–14 and the bands 18–22 out of position, thereby causing a first problem which must be overcome. Further, as the bands and straps are pushed out of position, the bottoming material settles between the straps and the surface 24 of last 16. Also, the mold cavity tends not to be air-tight. That is, note that the edges of strap 10 meet with the periphery 26 of surface 24 so that passageways tend to form at points 28 when the molding cavity is established. The portion of strap 10 at points 28 has been exaggerated to illustrate the tendency for the undesired passageways to form at these points.

Reference should now be made to FIGURE 2 which illustrates the first step in manufacturing shoes in accordance with the principles of this invention. Accordingly, a sole 30 is provided, the sole 30 being made of material suitable for adhering to any type of bottom forming compound such as vinyl or other thermoplastic materials. Also, other materials may be employed, such as cloth or leather. Attached to the unsupported sole 30 are various types of straps 32 and 34. The straps 32 and 34 together with the sole 30 comprise the upper shoe portion. These straps may be attached by stitching, stapling, heat-setting, etc. Onto this upper shoe portion will be molded the heel and sole of the sandal. Before describing the injection molding process in accordance with the invention, the apparatus for forming the mold cavity will be briefly described.

Reference should now be made to FIGURES 3, 4, and 5 which show top, side, and end views of an illustrative embodiment of a last in accordance with the invention. In most particulars, the last is the same as those lasts employed in prior art apparatus for manufacturing closed top shoes by injection molding processing except for the provision of a compressible portion 40 disposed around the periphery of the last 42. A typical material from which the peripheral compressible portion 40 may be made is urethane. Other materials will occur to those having ordinary skill in this art, the main characteristics of the material being that it is sufficiently compressible or resilient so that the straps of the sandal may be depressed into the material when the mold cavity is formed while at the same time being sufficiently resistant to the high temperatures and pressures occurring during the molding process so that shape retention is maintained. It will now be appreciated that due to the presence of the peripheral compressible portion 40, there is no tendency for passageways to be created at points such as points 28 in FIGURE 1. Typical values for the dimensions $a$, $b$, and $c$, shown in FIGURES 3, 4, and 5, are 0.375, 0.250, and 0.500 inch respectively, these values being given for the purpose of illustration only. Screws 43 or other appropriate means are provided for securing peripheral portion 40 to the last 42. A nail or other sharp projecting member 45 is provided on the last to insure the attachment thereto of the upper shoe portion, as will be described in more detail with respect to FIGURE 8. As indicated in FIGURES 4 and 5, heater 41, end plug 47, and wire 49 are provided to insure the proper temperature during the injection molding operation.

Reference should now be made to FIGURE 6 which shows an illustrative embodiment of a ring and sole plate assembly for forming the required molding cavity for the sole and heel to be attached to the upper portion of the shoe shown in FIGURE 2. The member 50 corresponds to a righthand ring of the mold assembly. That is, member 50 encloses the right half of a sole plate 52. The remaining half of the sole plate is enclosed by a lefthand ring 54 which is not shown in FIGURE 6 but which is indicated as 54 in FIGURES 7 and 9. In FIGURE 7, which is a partial cross-section along lines 7—7 of FIGURE 6, the relation of the rings 50 and 54 to the sole plate 52 is shown, the sides of the mold cavity being indicated at 56 and 58 and bottom thereof being indicated at 60. Seal lips 53 and 55 are peripherally secured to the top of the mold rings 50 and 54 respectively by suitable screws 57 and 59. The top of the mold cavity is formed by the surface 44 of the last shown in FIGURES 3–5. The peripheral, compressible portion 40 of the last shown in FIGURES 3–5 engages with the seal lips 53 and 55 of the rings 50 and 54, respectively.

In FIGURE 8, the upper shoe portion of FIGURE 2 is shown mounted on the last of FIGURES 3, 4, and 5. When this last is appropriately inserted into the cavity formed by rings 54 and 56 of FIGURE 7, the straps 10, 12 and 14 are depressed into the compressible material, thereby insuring an air-tight mold cavity.

Referring to FIGURE 6, channels 62 and 64 are provided for injecting the bottoming material through hole 66 during the molding operation, the channels 62 and 64 being appropriately aligned as shown in FIGURE 6. The source of bottoming material is not shown but would be connected to opening 68 of channel 62.

Referring to FIGURE 9, there is shown a cross-sectional view of the last of FIGURE 8 in engagement with rings and sole plate of FIGURE 6, the cross-section being taken on a line corresponding to line 7—7 of FIGURE 6. Assuming that strap 12 crosses where line 7—7 is located, it should be noted that strap 12 is depressed into compressible portion 40 by seal lips 53 and 55 as indicated at 80. Hence, there is no tendency for the injected bottoming material to leak or squirt out of the mold cavity.

Further since sole 30 is a solid piece of material and since the bottoming material is injected to the instep portion of the last as indicated in FIGURE 6, the tendency for the injected material to displace the straps or for the injected material to enter the space between the sole 30 and the last is reduced to an absolute minimum.

The method and apparatus described herein have been successfully employed in practice, thereby rendering the production of reasonably priced open top shoes, such as sandals, economically feasible.

FIGURES 10 and 11, respectively, illustrate side and top views of an adapter member 104 mounted to a partially illustrated last 42 having a peripheral compressible portion 40 which is secured to the last by metal screws 100. Attached to the metal last by screws 102 is an adapter 104. As seen in FIGURE 10, the adapter 104 consists of an outwardly projecting portion 105 and a further portion 107 which is approximately parallel to the surface of last 42. Further in FIGURE 10, it can be seen that a hole having a lip or hook portion 108 is formed in the molded sole 106, the lip providing suitable means for attaching or anchoring the toe-tongue 110, (see FIGURE 12 and 13) to the sole 106.

In FIGURES 12 and 13 there is shown a toe-tongue sandal produced with the adapter shown in FIGURES 10 and 11. In FIGURE 13 it can be seen how the toe-tongue 110 is mounted and anchored beneath the lip 108 formed in the sole 106.

Numerous modifications of the invention will become apparent to one of ordinary skill in the art upon reading the foregoing disclosure. During such a reading, it will be evident that this invention has provided a unique method and equipment for accomplishing the objects and advantages herein stated. Still other objects and advantages, and even further modification will be apparent from this disclosure. It is to be understood, however, that the foregoing disclosure is to be considered exemplary and not limitative, the scope of the invention being defined by the following claims.

What is claimed is:

1. A method of making open type shoes for both male and female where some portion of the shank, toe, or heel is open where the said portion meets the sole, such as sandals; the method comprising the following steps:

attaching straps of material or the like to a solid piece of material to thereby form the upper portion of the shoe;

mounting the said upper shoe portion onto a last having disposed around the periphery thereof a compressible portion;

surrounding a sole plate with at least two rings, said sole plate and rings including a channel therethrough for facilitating the injection of molding material;

engaging said last with said rings thereby compressing said straps between said rings and said compressible peripheral portion of said last and thereby forming an air-tight mold cavity enclosed by said last, said rings, and said sole plate, said mold cavity having the shape of a sole and heel to be mounted on said upper shoe portion;

heat said last; and injecting bottoming material into said air-tight cavity through said channel thereby molding said bottoming material to the bottom of said upper shoe portion and forming said sole and heel for said open top shoe.

2. A method as in claim 1 where said straps of material or the like are attached to the top of said solid piece of material.

3. A method, as in claim 2 where said bottoming material is injected into said mold cavity at a point adjacent the instep portion of said last thereby reducing the probability that said straps will be displaced by said injected material.

4. A method as in claim 2 including the step of forming a hole having a lip portion in the sole of said shoes whereby a strap portion of said shoes may be anchored to said sole by said lip portion.

References Cited

UNITED STATES PATENTS

| 2,795,822 | 6/1957 | Long | 18—59 |
| 3,007,209 | 11/1961 | Roberts | 18—59 |
| 3,192,545 | 6/1965 | DeWitt et al. | |
| 3,332,097 | 7/1967 | Rollman et al. | |
| 948,300 | 2/1910 | Eastwood | 12—142 |
| 2,744,340 | 5/1956 | Gerber | 36—11.5 |

PATRICK D. LAWSON, Primary Examiner

U.S. Cl. X.R.

36—11.5